US008911796B2

(12) United States Patent
Bakkenes et al.

(10) Patent No.: US 8,911,796 B2
(45) Date of Patent: *Dec. 16, 2014

(54) NON-CAKING SALT COMPOSITION, PREPARATION PROCESS AND USE THEREOF

(75) Inventors: Hendrikus Wilhelmus Bakkenes, Apeldoorn (NL); Roberto Aloysius Gerardus Maria Bergevoet, Beek (NL); Johannes Albertus Maria Meijer, Schalkhaar (NL); Maria Steensma, Arnhem (NL)

(73) Assignee: Akzo Nobel Chemicals International B.V., Amersfoort (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/322,294

(22) PCT Filed: May 27, 2010

(86) PCT No.: PCT/EP2010/057286
§ 371 (c)(1),
(2), (4) Date: Feb. 13, 2012

(87) PCT Pub. No.: WO2010/139587
PCT Pub. Date: Dec. 9, 2010

(65) Prior Publication Data
US 2012/0129952 A1   May 24, 2012

Related U.S. Application Data

(60) Provisional application No. 61/183,254, filed on Jun. 2, 2009.

(30) Foreign Application Priority Data

Jun. 2, 2009  (EP) .................................... 09161722

(51) Int. Cl.
| A01N 59/16 | (2006.01) |
| A61K 33/26 | (2006.01) |
| A61K 9/00 | (2006.01) |
| A61K 9/14 | (2006.01) |
| C01D 3/26 | (2006.01) |
| C07C 59/255 | (2006.01) |

(52) U.S. Cl.
CPC ........................ *C01D 3/26* (2013.01)
USPC ............ 424/646; 424/400; 424/489; 562/585

(58) Field of Classification Search
CPC .................................... A61K 9/00; C01D 3/26
See application file for complete search history.

(56) References Cited

U.S. PATENT DOCUMENTS

| 2,257,284 A | 9/1941 | Stokes et al. |
| 2,947,665 A | 8/1960 | Foster |
| 3,953,504 A | 4/1976 | Saotome et al. |
| 3,998,878 A | 12/1976 | Hearon et al. |
| 4,016,207 A | 4/1977 | Hearon et al. |
| 4,048,225 A | 9/1977 | Prescher et al. |
| 4,150,241 A | 4/1979 | Prescher et al. |
| 4,705,876 A | 11/1987 | Ivanov et al. |
| 6,800,263 B1 * | 10/2004 | Boon ............................ 423/268 |

FOREIGN PATENT DOCUMENTS

| DE | 1198662 | 1/1960 |
| JP | 51-098215 | 8/1976 |
| JP | 51-108017 | 9/1976 |
| JP | 2004-123685 | 4/2004 |
| NL | 7600872 | 8/1976 |
| WO | 00/59828 | 10/2000 |
| WO | 00/73208 | 12/2000 |

OTHER PUBLICATIONS

CSUS.edu (Kinetics chemistry lecture, Wayback machine date of May 7, 2006).*
Scholar Chemistry (Material Data Safety Sheet for Iron (III) Chloride, copyright 2008, Columbus Chemical Industries, pp. 1-2).*
International Search Report for PCT/EP2010/057286, dated Sep. 13, 2010, 4 pages.
Krist. Strukt. Neorg. Soedin., 1974, pp. 103-126, manual translation of the conclusion (no English translation provided).
Kroon, J., et al., "The Crystal Structures of Potassium Mesotartrate Dihydrate and the Isomorphous Rubidium Salt", Acta Cryst., 1965, vol. 19, pp. 293-297.
Kam, Kinson C., et al., "Chemical and Structural Diversity in Chiral Magnesium Tartrates and their Racemic and *Meso* Analogues", Crystal Growth & Design, 2007, vol. 7, No. 8, pp. 1522-1532.

* cited by examiner

*Primary Examiner* — Brian-Yong Kwon
*Assistant Examiner* — Mark V Stevens
(74) *Attorney, Agent, or Firm* — Kenyon & Kenyon LLP

(57) ABSTRACT

The present invention relates to a sodium chloride composition comprising an iron complex of tartaric acid wherein between 55 and 90% by weight of the tartaric acid is meso-tartaric acid. The present invention furthermore relates to a process to prepare such a sodium chloride composition and to the use of such a sodium chloride composition.

8 Claims, 1 Drawing Sheet

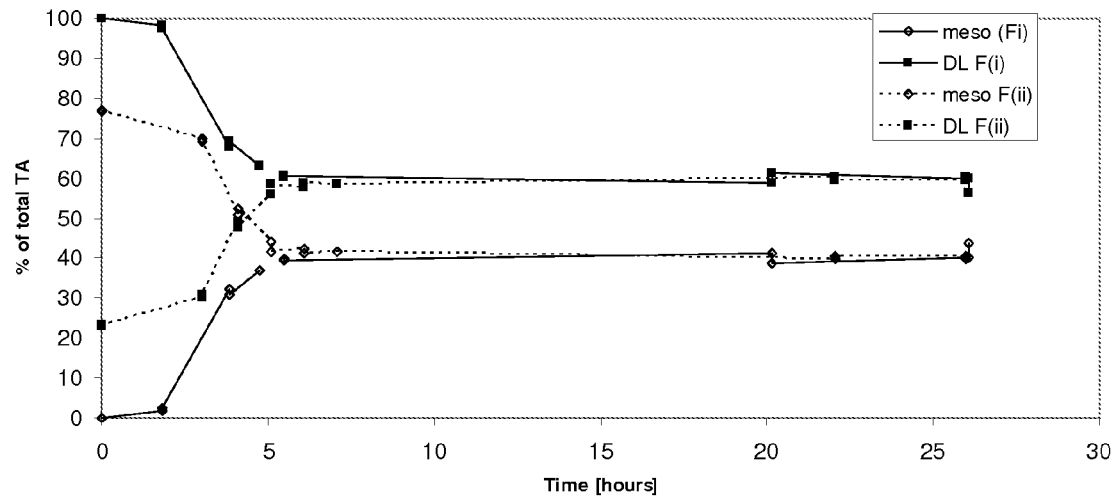
Figure 1: Relative conversion in time of comparative examples F(i) and F(ii)
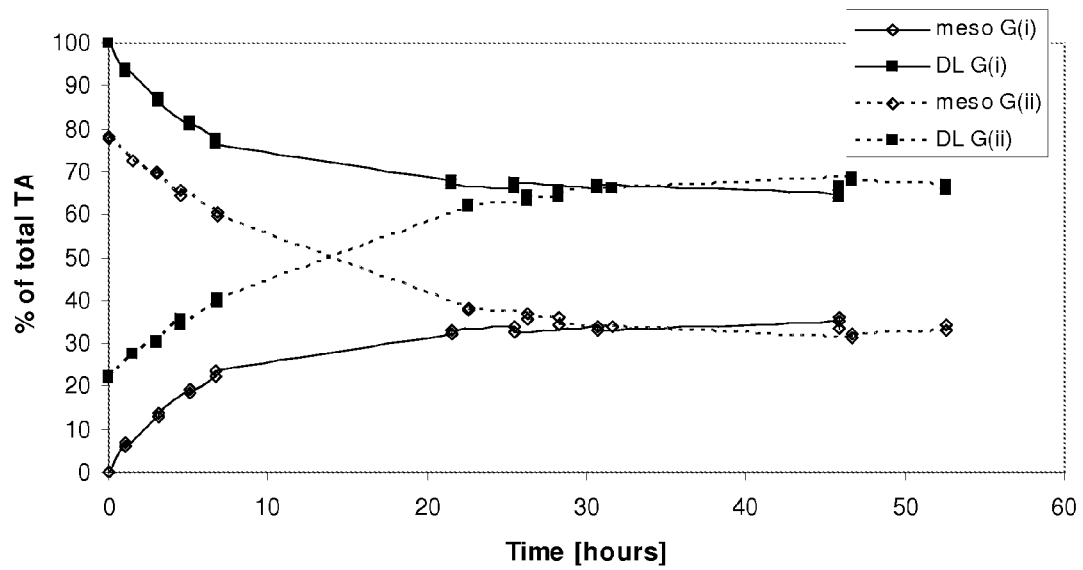
Figure 2: Relative conversion in time of comparative examples G(i) and G(ii)

NON-CAKING SALT COMPOSITION, PREPARATION PROCESS AND USE THEREOF

REFERENCE TO RELATED APPLICATIONS

This application is the U.S. National Phase of PCT/EP2010/057286 filed on May 27, 2010, and claims the benefit of U.S. Provisional Application No. 61/183,254, filed on Jun. 2, 2009.

FIELD OF INVENTION

The present invention relates to a salt composition comprising iron complexes of meso-tartaric acid, to a process to make such a sodium chloride (salt) composition, and to the use of such sodium chloride compositions.

BACKGROUND

Sodium chloride tends to form large, agglomerated masses upon exposure to moisture, particularly during long periods of storage. These hardened masses are generally referred to as cakes. A non-caking agent is often added to the salt to prevent the formation of cakes. Sodium or potassium ferrocyanide is often used as a non-caking additive. However, a major disadvantage of these compounds is that they contain nitrogen. The presence of nitrogen in salt compositions is highly undesired, because when the salt is used in electrolysis operations, explosive $NCl_3$ will be obtained. Another disadvantage of commercially used ferrocyanide is the fact that the iron introduced by this agent is very difficult to remove from brine produced from salt containing said anti-caking agent. Especially if the brine is used in membrane electrolysis cells, the ferrocyanide that is introduced will disintegrate in the cell and the free iron will precipitate, typically in the form of the hydroxide, in and on the membrane. This will lead to less efficient membrane electrolysis operations. Further, there is an ongoing debate in respect of the desirability of sodium or potassium ferrocyanide in table salt.

In recent years much effort has been put into the development of improved non-caking salt agents which are inexpensive and environmentally safe, and which are effective in small amounts. WO 00/59828, for instance, describes the use of a metal complex of a hydroxypolycarboxylic compound as a non-caking agent in salt compositions. Complexes of iron with these hydroxypolycarboxylic acids were found to render salt non-caking at low concentrations. It is described that the use of tartaric acid has particular advantages. Further, it is described that meso-tartaric acid is the most preferred anti-caking agent. However, although pure meso-tartaric acid is commercially available, prices are much too high for application in a non-caking additive for sodium chloride on industrial scale.

WO 00/59828 discloses that besides an iron, titanium and/or chromium complex of meso-tartaric acid also a mixture of hydroxypolycarboxylic acids wherein at least 5% by weight of the hydroxypolycarboxylic acid is meso-tartaric acid can be used as non-caking additive for sodium chloride. In this respect, WO 00/59829 discloses a method for producing a mixture of tartaric acid which includes meso-tartaric acid. It mentions that it can be prepared by treating a natural or synthetic tartaric acid (CAS registry numbers 87-69-4 and 147-71-7, respectively) solution with concentrated NaOH at temperatures above 100° C. Part of the L-, D-, and/or DL-tartaric acid is then converted to the desired meso-tartaric acid (CAS registry number 147-73-9). It was found that by following this procedure, it is merely possible to prepare a mixture of tartaric acid with up to a maximum of 50% by weight being the meso isomer.

Electrolyser membranes and electrodes are extremely sensitive to impurities in the brine, particularly multivalent metal ions such as iron. The multivalent metals tend to precipitate inside the membrane, causing irreversible damage to the membrane. Not only inorganic contaminants form a problem. Also organic compounds present in the brine may cause problems. When brine solution containing organic contaminants is electrolyzed, the organic species may precipitate on the surface of and within an electrolysis cell membrane causing plugging. Some organic compounds, such as tartaric acid, do not give precipitate problems because they are broken down to harmless $CO_2$. However, this $CO_2$ ends up in certain downstream products. When a boundary level is exceeded, this $CO_2$ gives rise to purity problems. Hence, to achieve maximum life-time of a separator in an electrolysis cell and to avoid purity problems, the concentration of organics and multivalent metal cations such as iron should be reduced to as low a level as possible in the feed-brine solution.

With compositions according to Example 1 of WO 00/59828 wherein meso-tartaric acid is used in combination with hydropolycarboxylic acids such as DL-tartaric acid, relatively high amounts of organics are introduced on the salt. On the other hand, using commercially available 100% meso-tartaric acid, even when used in admixture with racemic DL-tartaric acid or L-tartaric acid, is economically not feasible because of its high price.

SUMMARY OF THE INVENTION

It is an object of the present invention to provide a non-caking salt composition comprising a non-caking additive which is commercially attractive, readily accessible, and effective in relatively low dosage. It is furthermore an object of the present invention to provide a non-caking salt composition comprising a non-caking additive that can be used in electrolysis operations and any possible adverse effects of which on the life-time of the diaphragm or membrane in electrolysis cells and on the purity of downstream products are reduced.

Surprisingly, we have now found that the objective has been met by preparing a sodium chloride composition comprising an iron complex of tartaric acid wherein between 55 and 90% by weight of the tartaric acid is the meso isomer (which is also denoted as non-caking additive). Preferably, a 10% by weight aqueous solution of said sodium chloride composition has a pH value of between 3 and 12. Most preferably, a 10% by weight aqueous solution of said sodium chloride composition has a pH value of between 6 and 11. It has been found that the non-caking additive according to this invention has improved non-caking activity as compared to pure meso-tartaric acid and any of the hydropolycarboxylic acid mixtures comprising meso-tartaric acid explicitly disclosed in WO 00/59828. Furthermore, when the non-caking sodium chloride composition according to the present invention is used in electrolysis operations, less iron is introduced in the electrolysis cells as compared to a non-caking sodium chloride composition comprising conventional ferrocyanide as non-caking additive. In more detail, the iron in ferrocyanide is relatively strongly bound and will not be removed in conventional brine purification processes. The iron in the non-caking additive used in accordance with the present invention, however, is bound relatively weakly to the (meso) tartaric acid. Under the conditions used in brine purification processes, the non-caking additive will dissociate and the majority of the iron can be removed, e.g. by precipitation. Furthermore, since the amount of organics on the salt has been reduced compared to the (meso)tartaric acid non-caking additives known in the art, less $CO_2$ is formed in electrolysis operations, resulting in downstream products with higher purity.

BRIEF DESCRIPTION OF DRAWINGS

FIG. 1 shows the relative conversion in time of comparative examples F(i) and F(ii).

FIG. 2 shows the relative conversion of time in comparative examples F(i) and F(ii).

DETAILED DESCRIPTION OF INVENTION

As already described above, WO 00/59828 discloses in the Examples a method for producing a mixture of tartaric acid. However, it was found that with said method, only tartaric acid mixtures comprising up to a maximum of 50% by weight of meso-tartaric acid can be obtained. Until now, however, no easy and economically attractive processes existed for the preparation of mixtures of tartaric acid comprising over 50% by weight of mesotartartic acid.

Several stereoselective synthetic routes towards pure meso-tartaric acid exist. However, they are regarded as less attractive than the crystallization route described in this disclosure. For instance, it was found that epoxidation of fumaric acid with concentrated $H_2O_2$ followed by hydrolysis will lead to formation of only the meso-isomer of tartaric acid, without the use of any metal salts. However, relatively harsh process conditions, low conversion, and byproduct formation make this a not very attractive route. Moreover, it has been found that maleic acid can be converted to meso-tartaric acid in the presence of $KMnO_4$. The main drawback of this route is the stoichiometric consumption of $KMnO_4$ and the need to separate the meso-tartaric acid out of the meso-tartaric acid manganese salt—for application as non-caking additive on sodium chloride the meso-tartaric acid has to be virtually Mn-free. Along the same lines, Mn/Amine complex as catalyst or oxidizing agent and optionally $H_2O_2$ may be used to convert maleic acid into meso-tartaric acid, but with similar product purification challenges.

We have now developed a novel and economically attractive process for the preparation of mixtures of tartaric acid with between 55 and 90% by weight of meso-tartaric acid. Said process comprises the following steps: (i) preparing an aqueous mixture comprising between 35 and 65% by weight, and preferably between 40 and 60% by weight, of a di-alkali metal salt of L-tartaric acid, a di-alkali metal salt of D-tartaric acid, a mixture of di-alkali metal salts of L-tartaric acid, D-tartaric acid, and optionally meso-tartaric acid, and between 2 and 15% by weight, and preferably between 4 and 10% by weight, of an alkali metal or alkaline metal hydroxide, and (ii) stirring and heating the mixture to a temperature of between 100° C. and its boiling point until between 55 and 90% by weight of tartaric acid, preferably between 60 and 80% by weight of tartaric acid, has been converted to meso-tartaric acid.

In a further aspect, the present invention relates to a process for the preparation of the non-caking chloride composition according to the present invention. This process comprises the steps of spraying an aqueous treatment solution comprising an iron complex of tartaric acid, with between 55 and 90% by weight of said tartaric acid, and preferably between 60 and 80% by weight of said tartaric acid, being meso-tartaric acid, and having a pH of between 3 and 5, and preferably having a pH of between 4 and 4.5, onto a sodium chloride composition.

Said aqueous treatment solution is preferably obtainable by (i) preparing an aqueous mixture comprising between 35 and 65% by weight, and preferably between 40 and 60% by weight, of a di-alkali metal salt of L-tartaric acid, a di-alkali metal salt of D-tartaric acid, a mixture of di-alkali metal salts of L-tartaric acid, D-tartaric acid, and optionally meso-tartaric acid, and between 2 and 15% by weight, preferably between 4 and 10% by weight, of an alkali metal or alkaline metal hydroxide, (ii) stirring and heating the aqueous mixture to a temperature of between 100° C. and its boiling point until between 55 and 90% by weight of tartaric acid, and preferably between 60 and 80% by weight of tartaric acid, has been converted to meso-tartaric acid, (iii) cooling the obtained mixture, (iv) optionally adjusting the pH to a pH of between 5 and 9, (v) stirring and admixing the obtained mixture with an iron(II) and/or an iron(III) salt, (vi) and if the pH is outside the range of between 3 and 5, adjusting the pH to a pH of between 3 and 5.

It was found that with the process according to the present invention, either from the start of the process (i.e. in step (i)) or during step (ii)), the solubility limit of meso-tartaric acid will be exceeded, which will result in meso-tartaric acid precipitating from the reaction mixture. Accordingly, the term "aqueous mixture" as used throughout the description is used in relation to clear aqueous solutions, but also in relation to water-based slurries.

Preferably, an aqueous solution of the iron(II) and/or iron (III) salts is used in step (v), although it is also possible to add said iron salt(s) in the solid form.

In step (iii), the mixture is preferably cooled to a temperature of 90° C. or lower, and more preferably to a temperature of 70° C. or lower. In a preferred embodiment, water is added to the mixture obtained in step (ii) (typically a small amount), e.g. during step (iii). In step (vi), it is also possible to add water, in order to prepare a treatment solution having the required concentration. In a preferred embodiment, the reaction mixture obtained in step (iii) is admixed with the iron(II) and/or iron(III) salts by adding it to an aqueous solution of said iron(II) and/or iron(III) salts.

The alkali metal in the di-alkali metal salts of the tartaric acids used in this process as starting material preferably comprises sodium. The alkali metal or alkaline metal hydroxide used in this process preferably comprises sodium hydroxide.

L(+)-tartaric acid disodium salt, also denoted as bisodium L-tartrate, is commercially available, e.g. from Sigma-Aldrich (CAS Number 6106-24-7). It is noted that instead of using L(+)-tartaric acid disodium salt, it is also possible to use L(+)-tartaric acid (commercially available from e.g. Sigma-Aldrich, CAS Number 87-69-4) and prepare the L(+)-tartaric acid disodium salt in situ, by addition of additional NaOH. The same holds for the other potential starting material, DL-tartaric acid disodium salt: it may be purchased from e.g. Sigma-Aldrich or produced in situ from DL-tartaric acid (CAS Number 133-37-9) or DL-tartaric acid monosodium salt and NaOH. In fact any tartaric acid source, containing D, L, meso in any proportion and in the acidic or salt form can be used for this process. D-tartaric acid can also be used as starting material, but this is less preferred because it is relatively expensive. The use of L-tartaric acid disodium salt (either produced in situ by addition of NaOH or used as such) is preferred because these starting materials are relatively cheap and the process to prepare a composition with between 55 and 90% by weight of meso-tartaric acid is faster than when a mixture of D- and L-tartaric acid is used as starting material. Obviously, it is also possible to use a mixture of D-, L-, and meso-tartaric acid.

The process is preferably carried out at atmospheric pressure. However, it is also possible to perform the process at elevated pressure, e.g. 2-3 bar, but this is less preferred.

It is noted that the period of time the mixture needs to be stirred and heated (i.e. step (ii) of the preparation process) to obtain the desired amount of meso-tartaric acid is dependent on the concentration of tartaric acid in the aqueous mixture, the amount of alkali or alkaline metal hydroxide present, temperature and pressure. Typically, however, in step (ii) the mixture is stirred and heated for between 3 and 200 hours, if the process is performed at atmospheric pressure.

The amount of meso-tartaric acid in the mixture in step (ii) can be determined methanesulphonic acid as internal standard). The NMR-spectrum of meso-tartaric acid is slightly different from the NMR-spectrum of DL-tartaric acid. NMR is used to determine the meso-tartaric acid:DL-tartaric acid ratio in a reaction sample or optionally to quantify the DL or meso isomer concentration by using an internal or external standard. D- and L-tartaric acid cannot be distinguished by NMR directly. To determine the concentrations of D-, L-, and meso-tartaric acid, chiral HPLC is a suitable method.

As the skilled person will recognize, depending on the pH value, tartaric acid is present in an aqueous solution in the carboxylic acid form or in the form of a salt (bitartrate or tartrate). For example, it is present as the disodium salt if sodium hydroxide is present in a sufficiently high amount. For convenience's sake, the term "tartaric acid" is used throughout the description for the acidic form as well as for the tartrate and bitartrate forms.

As mentioned above, the non-caking additive according to the present invention comprises an iron complex of tartaric acid wherein between 55 and 90% by weight of said tartaric acid is meso-tartaric acid. Preferably, it comprises an iron complex of tartaric acid wherein between 60 and 80% by weight of the tartaric acid is meso-tartaric acid. In that case the non-caking activity of the non-caking additive is very good, while as little iron and organics as possible are introduced into the sodium chloride composition.

Other than in the operating examples, or where otherwise indicated, all numbers expressing quantities of ingredients, reaction conditions, and so forth used in the specification and claims are to be understood as being modified in all instances by the term "about".

The term "sodium chloride composition" as used throughout the description is meant to denominate all compositions of which more than 75% by weight consists of NaCl. Preferably, such salt contains more than 90% by weight of NaCl. More preferably, the salt contains more than 92% of NaCl, while a salt of more than 95% by weight NaCl is most preferred. Typically, the salt will contain about 2-3% water. The salt may be rock salt, solar salt, salt obtained by steam evaporation of water from brine, and the like.

By the term "non-caking sodium chloride composition" is meant a composition comprising the non-caking additive according to the invention in such an amount that the caking energy of said composition is equal to or lower than 90% of the caking energy of the corresponding sodium chloride composition not comprising said non-caking additive.

Both di- and trivalent iron sources (ferro- and ferri-salts, respectively) can be used to prepare the non-caking additive according to the present invention. However, the use of an iron(III) source is most preferred. It is preferably $FeCl_3$ or $FeCl(SO_4)$. $FeCl_3$ is most preferred.

The molar ratio between iron and the total amount of tartaric acid in the non-caking composition (i.e. the molar amount of iron divided by the total molar amount of tartaric acid) is preferably between 0.1 and 2, more preferably between 0.3 and 1. The iron complexes of tartaric acid are preferably used in an amount such that the non-caking sodium chloride composition comprises a concentration of at least 1 ppm, and preferably at least 1.5 ppm, of the non-caking additive, based on iron. Preferably, no more than 200 ppm, based on iron, of the non-caking additive is present in the non-caking sodium chloride composition. For electrolysis operations, preferably no more than 5 ppm, and most preferably no more than 3 ppm, based on iron, of the non-caking additive is present in the non-caking sodium chloride composition.

The pH of the non-caking sodium chloride composition is measured by preparing an aqueous solution comprising 10% by weight of the sodium chloride composition via a conventional pH determination method, such as using a pH meter. The pH of the sodium chloride composition can be adjusted, if so desired, by means of any conventional acid or base. Suitable acids include hydrochloric acid, sulphuric acid, formic acid, and oxalic acid. Suitable bases include sodium hydroxide, potassium hydroxide, sodium carbonate, and potassium carbonate. The acid or base can be added to the sodium chloride composition separately or together with the non-caking additive. For the final composition to be nitrogen-free, the acid and base are preferably selected from nitrogen-free products. Accordingly, HCl is preferably used if an acid is to be added and NaOH is preferably added if a base is added.

The pH of a sodium chloride composition may be adjusted to the desired level, prior to addition of the non-caking additive according to the present invention. The way the acid or base is introduced depends on the desired water content of the resulting salt and the water content of the salt to be treated. Typically, a concentrated solution of the acid or base is sprayed onto the salt.

As mentioned above, the present invention relates to a process for the preparation of said non-caking sodium chloride composition comprising the steps of spraying an aqueous solution comprising an iron complex of tartaric acid, with between 55 and 90% by weight (and preferably between 60 and 80% by weight) of said tartaric acid being meso-tartaric acid, and having a pH of between 3 and 5, preferably between 4 and 4.5, onto a sodium chloride composition.

The iron complex of tartaric acid, with between 55 and 90% by weight of the tartaric acid being meso-tartaric acid, can be introduced or formed in and on the sodium chloride composition in various conventional ways. However, a preferred way is to dissolve the iron source, the tartaric acid, and optionally further components such as sodium chloride and/or pH controlling agents, in water and spray said solution onto a sodium chloride composition.

In more detail, an aqueous solution comprising the iron source and tartaric acid with 55 to 90% by weight thereof being meso-tartaric acid and optionally sodium chloride, is prepared as described above. Optionally the pH of said aqueous solution is adjusted and/or buffered by addition of an acid such as HCl, formic acid, oxalic acid, sulphuric acid, or a combination thereof. The sodium chloride concentration may range from 0% by weight to saturated. Said aqueous solution is hereinafter denoted as treatment solution.

The treatment solution preferably comprises between 0.5 and 25% by weight of tartaric acid, with 55 to 90% by weight (preferably 60 to 80% by weight) thereof being meso-tartaric acid. An iron source is preferably present in an amount such that the molar ratio between iron and the total amount of tartaric acid in the treatment solution is between 0.1 and 2, and more preferably between 0.3 and 1. This solution is preferably sprayed onto the sodium chloride composition in such an amount as to obtain a concentration of at least 1, more preferably at least 1.2, and most preferably at least 1.5 ppm, of iron in said non-caking sodium chloride composition. Preferably, it is sprayed onto the sodium chloride composition in such an amount that no more than 200 ppm of iron is introduced onto said non-caking sodium chloride composition. If the non-caking salt composition is to be used in electrolysis operations, preferably, no more than 5 ppm, and most preferably no more than 3 ppm, is introduced onto said non-caking sodium chloride composition.

The sodium chloride composition according to the present invention can be used as feed, food, pharma, retail and industrial salt. It can also be used as road salt, or it can be used in electrolysis operations. Preferably, it is used in a membrane electrolysis operation.

The present invention is further illustrated by the following examples.

EXAMPLES

The salt applied in the Examples is Sanal SQ (AkzoNobel). The pH of the sodium chloride composition is measured at 21° C. in a conventional way after dissolving 10 g of the sodium chloride composition in 90 g water.

Adhering water in salt is determined by weight loss measurement upon drying either for 4 days at 35° C. and 40% relative humidity or for 2 hours at 120° C.

Caking is measured in triplicate in a Powder Flow Analyzer or, for short, rheometer (type TA-XT21, Stable Micro Systems). The containers are filled with ~50 g salt sample and preconditioned by compressing with 1 kg weight and purging with dry air for 2 hours. After that a screw-like moving blade is entered into the salt. The rheometer continuously measures the force and torque imposed on the salt by the moving blade. When the force is plotted against the traveling depth in the product, the integral underneath the curve equals the amount of consumed energy. The CE4 value is the caking energy in N·mm measured over a distinct range of 4 mm bed height after approximately 4 mm blade travel. The higher the caking energy, the more caking (so the lower the caking energy, the better). The precision of this method is estimated to be 2 s=35%. To eliminate other influences such as air humidity on the results, it is recommended to focus on trends within the same series of measurements, as expressed by a relative caking energy.

Standardized Test for Determination of Effect of Non-Caking Additive on Relative Caking Energy Sanal SQ salt was weighed at 49±0.5 g with the addition of 1 g water, thus reaching 2 wt % water on the salt. Then the desired amount of anti-caking agent was added. The salt with anti-caking agent was mixed well by kneading salt in a small plastic bag for approximately 5 minutes manually. The sample was compressed with 1 kg weight on the rheometer and released. The sample was purged with dry air that was introduced through the bottom (90 l/h) for at least 2 hours. The amount of evaporated water was measured by weighing. The caking energy in N·mm was measured by the rheometer.

Comparative Example A

Caking Energy of Conventional Non-Caking Additive

A known amount of concentrated sodium ferrocyanide $(Na_4Fe(II)(CN)_6)$ solution, the conventional anti-caking agent, was added to Sanal SQ salt as described above, resulting in 2.5 ppm of ferrocyanide, i.e. 0.7 ppm Fe(II), on the salt. A caking energy of 29 N·mm was measured. Sodium ferrocyanide was obtained from Sigma.

Example 1 and Comparative Examples B and C

Effect of Non-Caking Additives on Relative Caking Energy

To test the non-caking performance of a non-caking additive according to the present invention, the caking energy was measured using the standardized test as described above. As explained, the lower the caking energy, the better the anticaking agent works. In each of the experiments 3 ppm Fe(III), added as $FeCl_3$, was applied on sodium chloride, but the amounts and isomeric ratio of tartaric acids (TA) differed (see Table 1). A larger amount of TA means a larger amount of organics applied onto the salt ("organics load"). The results were compared with the performance of the conventional anticaking agent at conventional dosage level (2.5 ppm ferrocyanide) (=100% relative caking energy), see Comparative Example A.

TABLE 1

Effect of non-caking additive on relative caking energy (the lower, the better). Fe(III) = 3 ppm

| Example | Molar ratio Fe:total TA | Molar ratio Fe:mTA | % meso of total TA | Relative organics load (%) | relative caking energy (%) |
|---|---|---|---|---|---|
| B | 1:3 | 1:1 | 33 | 200 | 55 |
| 1 | 1:1.5 | 1:1 | 65 | 100 | 54 |
| C | 1:1.5 | 1:1.5 | 100 | 100 | 97 |
| A | ferrocyanide | (2.5 ppm) | | | 100 |

It is clear that the non-caking additive according to the present invention wherein 65% by weight of tartaric acid is the meso isomer, gives the best results (Example 1). With the non-caking agent according to the present invention a much lower caking energy is measured than with conventional ferrocyanide (Comparative Example A).

With the non-caking additive according to Comparative Example C, i.e. the same amount of tartaric acid, but here consisting of 100% by weight of the meso isomer, the caking energy is about double that with the non-caking additive of Example 1. With the non-caking additive according to Comparative Example B, wherein 33% by weight of the total amount of tartaric acid is the meso isomer, it was found that the double amount of TA is needed to reach the same low caking energy as obtained for Example 1.

Examples 2 and 3 and Comparative Examples D and E

Effect of DL/Meso Ratio in Non-Caking Additives

The optimal composition of the non-caking additive was demonstrated further by measuring the caking energy in four salt samples prepared according to the standard method described above. In each sample Fe(III)=2 ppm and the molar ratio Fe:TA=1:1.5 (TA referring to total TA). The amount of additive was the same for all four samples; however, the ratio meso-tartaric acid:DL-tartaric acid differed. The following relative caking energy values were obtained, with Example 3 selected as 100% relative caking energy.

TABLE 2 effect of meso-tartaric acid:DL-tartaric acid (meso:DL) ratio in
TA on relative caking energy (the lower the number, the better);
Fe(III) = 2 ppm, water content = 2 wt %, Fe:total TA = 1:1.5

| Example | meso:DL ratio | Fe:mTA | relative caking energy (%) |
|---|---|---|---|
| D | 33:67 | 1:0.5 | 195 |
| 2 | 67:33 | 1:1 | 111 |
| 3 | 80:20 | 1:1.2 | 100 |
| E | 100:0 | 1:1.5 | 129 |

The non-caking additive according to the present invention wherein 80% by weight of tartaric acid is the meso isomer, gives the best result (Example 3). With the non-caking additive according to Comparative Example D, in which 33% by weight of tartaric acid is the meso isomer, the caking energy is about double that of the non-caking additive of Example 3. With the non-caking additive according to Comparative Example E, consisting of 100% by weight of the meso isomer, the caking energy is higher than those obtained for Examples 2 and 3.

Example 4

Preparation of a Non-Caking Additive According to the Present Invention

Example 4a

Preparation of a Non-Caking Additive Via L-Tartaric Acid

In a 200-liter steam heated jacketed vessel 156.6 kg of 50 wt % sodium hydroxide (in water) solution (ex Sigma, analyzed NaOH concentration 49.6 wt %) was mixed with 18.4 kg of demineralized water and 106.1 kg L-tartaric acid (ex Caviro Distillerie, Italy). Neutralization took place to yield a solution containing 48.7 wt % L-tartaric disodium salt, 7.5 wt % free NaOH, and 43.7 wt % water. The mixture was boiled at atmospheric pressure under total reflux and stirring for 24 hours in total. During this period samples were taken and the conversion of L-tartrate to mesotartrate was determined by $^1$H-NMR. Results can be found in Table 3. During the synthesis some of the mesotartrate reacted further to D-tartrate.

TABLE 3

Relative conversion in time according to Example 4a.

| Time [hours] | Meso [wt % of total TA] | D + L [wt % of total TA] |
|---|---|---|
| 0 | 0 | 100 |
| 2.0 | 22 | 78 |
| 4.0 | 29 | 71 |
| 5.7 | 33 | 67 |
| 7.7 | 45 | 55 |
| 9.8 | 51 | 49 |
| 11.7 | 54 | 46 |
| 13.7 | 61 | 39 |
| 15.8 | 66 | 34 |
| 17.7 | 70 | 30 |
| 19.7 | 73 | 27 |
| 22.8 | 76 | 24 |
| 24.0 | 77 | 23 |

After approximately 4.0-4.5 hours of boiling, the mixture became hazy and solids were precipitating from the solution. During the rest of the experiment the slurry density was increasing.

Via chiral HPLC the absolute amounts of D-, L-, and meso-tartaric acid were determined (Column used: Chirex 3126 (D)-penicillamine (ligand exchange)) (see Table 4).
HPLC Conditions:
Guard column: none
Analytical column: Chirex 3126 (D) 50×4.6 mm ID; $d_p$=5 μM
Mobile phase: Mixture of 90% Eluent A, 10% Eluent B. Filtered and degassed
Eluent A: 1 mM Copper (II) acetate and 0.05 M Ammonium acetate,
pH=4.5 (using Acetic acid)
Eluent B: Isopropanol
Separation mode: Isocratic
Flow rate: 2.0 ml/min
Temperature: 50° C.
Injection volume: 2 μl
Detection: UV at 280 nm

TABLE 4

Absolute concentreations and relative conversion in time according to Example 4a.

| | Expressed as sodium salt form | | | meso | D + L |
|---|---|---|---|---|---|
| Time [hours] | Meso [wt %] | L [wt %] | D [wt %] | [wt % of total TA] | [wt % of total TA] |
| 2 | 10.6 | 34.5 | 1.1 | 23 | 77 |
| 4 | 14.5 | 30.4 | 2.5 | 31 | 69 |
| 5.8 | 17 | 27.3 | 3.8 | 35 | 65 |
| 7.8 | 22.2 | 20.8 | 5 | 46 | 54 |
| 9.8 | 24.9 | 17.5 | 5.1 | 52 | 48 |
| 11.8 | 26.7 | 16 | 5.3 | 56 | 44 |
| 13.8 | 30.7 | 12.3 | 5.2 | 64 | 36 |
| 15.8 | 33.2 | 10.4 | 4.8 | 69 | 31 |
| 17.8 | 35.2 | 9 | 4.4 | 72 | 28 |
| 19.8 | 36.3 | 7.7 | 4.3 | 75 | 25 |
| 22.9 | 32.7 | 5.5 | 3.4 | 79 | 21 |
| 24 | 38.9 | 6.4 | 3.9 | 79 | 21 |

HPLC results confirm $^1$H-NMR results.

A non-caking treatment solution suitable for spraying onto a sodium chloride composition in order to render it non-caking was prepared as follows:

To 40.126 kg of the reaction product of Example 4a, 15.241 kg of demineralized water and 3.00 kg of L-tartaric acid were added to get a clear solution with a meso-tartaric acid content of 66% of the total amount of tartaric acid. To 99.98 g of this mixture, 49.55 g of a 40 wt % FeCl$_3$-solution in water were added. Using 16.6 g of a 50 wt % of sodium hydroxide solution in water, the pH was set to 4.35. Finally, 1163.6 g of demineralized water were added to obtain the desired final iron concentration.

This resulting non-caking treatment solution consisted of 0.56 wt % of Fe(III), 1.55 wt % of meso-tartaric acid and 0.79 wt % of DL-tartaric acid. When sprayed onto a sodium chloride composition in an amount of 0.5 liters per ton of the sodium chloride composition, 3 ppm of iron and 12 ppm of tartaric acid were present in the resulting non-caking sodium chloride composition.

Example 4b

Preparation of a Non-Caking Additive Via DL-Tartaric Acid

In a 30-liter steam-heated jacketed vessel 15.41 kg of 50 wt % of sodium hydroxide (in water) solution (ex Sigma) were mixed with 1.815 kg of demineralized water and 10.592 kg of racemic DL-tartaric acid (ex Jinzhan, Ninghai organic chemical factory, China). The mixture was boiled under reflux at atmospheric pressure and stirred for 190 hours in total. During this period samples were taken of the reaction mixture and the conversion of DL-tartaric acid to meso-tartaric acid was determined by $^1$H-NMR (see Table 5).

TABLE 5

Relative conversion in time according to Example 4b.

| Time [hours] | Meso [wt % of total TA] | DL [wt % of total TA] |
|---|---|---|
| 0 | 0 | 100 |
| 2 | 8 | 92 |
| 4 | 12 | 88 |
| 24 | 47 | 53 |
| 29 | 56 | 44 |
| 46 | 73 | 27 |
| 70 | 78 | 22 |
| 94 | 83 | 17 |
| 190 | 88 | 12 |

Solids were present during the whole experiment.

Via chiral HPLC the absolute amounts of meso-tartaric acid and DL-tartaric acid were determined. (Column used: Chirex 3126 (D)-penicillamine (ligand exchange)) (see Table 6).

TABLE 6

Absolute concentrations and relative conversion in time according to Example 4b.

| | Expressed as sodium form | | | meso | DL |
|---|---|---|---|---|---|
| Time [hours] | Meso [wt %] | L [wt %] | D [wt %] | [wt % of total TA] | [wt % of total TA] |
| 2 | 4.1 | 21.2 | 21.3 | 9 | 91 |
| 4 | 6.1 | 20.4 | 20.7 | 13 | 87 |
| 24 | 21.5 | 10.8 | 11.0 | 50 | 50 |
| 29 | 26.0 | 10.2 | 9.9 | 56 | 44 |
| 46 | 31.5 | 5.2 | 5.3 | 75 | 25 |
| 52 | 37.2 | 4.0 | 4.1 | 82 | 18 |
| 70 | 31.2 | 3.8 | 3.9 | 80 | 20 |
| 94 | 35.5 | 3.5 | 3.5 | 84 | 16 |
| 190 | 40.7 | 2.6 | 2.7 | 88 | 12 |

It can be seen that both raw materials (Examples 4a and 4b) lead to the same final product, a tartaric acid mixture containing primarily meso-tartaric acid and some D and L, with the D:L ratio approaching 50:50 over time (the thermodynamic equilibrium). L-tartaric acid as starting material gives a faster conversion. Other process parameters such as NaOH concentration influence the conversion rate as well.

Work-up was done by the same method as described in Example 4a.

Comparative Example F

Effect of Higher NaOH Content and Lower Sodium Tartrate Content

Example F (i)

L-Tartaric Acid as Starting Material

In a 1-liter reactor vessel, 606.04 g of NaOH solution (containing 50 wt % of NaOH and 50 wt % of water) were mixed with 414.40 g water and 96.70 g of L-tartaric acid. Upon mixing, a mixture comprising 11.2 wt % of disodium L-tartrate, 22.5 wt % of NaOH, and 66.3 wt % of water was obtained. The mixture was heated and was kept at atmospheric boiling conditions under reflux for 26 hours ($T_{boil}$~110° C.), under continuous stirring. A clear solution was obtained. At regular intervals, a sample was taken from the liquid and analyzed by $^1$H-NMR for meso-tartaric acid, DL-tartaric acid, and acetate content (a distinction between the D and L-enantiomer cannot be made by $^1$H-NMR).

The $^1$H-NMR analysis showed that L-tartaric acid is converted to meso-tartaric acid until a level of about 40 wt % meso (based on the total amount of tartaric acid) is obtained (see Table 7). After that point, prolonged boiling does not result in increased conversion to mesotartrate. However, the amount of byproduct acetate increased with time to about 1 wt %.

After approximately 6 hours of boiling a small amount of solids appeared. 1H-NMR and IR analysis showed this solid to be primarily sodium oxalate, a tartaric acid degradation product.

TABLE 7

Relative conversion in time according to Example F(i).

| boiling time (hr) | Meso (wt % of total TA) | DL (wt % of total TA) |
|---|---|---|
| 0 | 0 | 100 |
| 1.8 | 2 | 98 |
| 3.8 | 31 | 69 |
| 4.8 | 37 | 63 |
| 5.5 | 39 | 61 |
| 20.2 | 40 | 60 |
| 26.1 | 40 | 60 |

Example F (ii)

A Mixture of Mesotartrate and DL-Tartarate as Starting Material

Prepared were 1,470 g of a mixture containing 11.4 wt % disodium tartrate, (of which 78 wt % was mesotartrate and 22 wt % DL-tartrate), 21.8 wt % NaOH, and 66.8 wt % water. For practical reasons, this mixture was prepared from NaOH solution, water, and a reaction mixture prepared according to the procedure in Example 4a). This means that the starting mixture is similar in all respects to the starting mixture of Example F(i), except for the meso:DL ratio of the disodium tartrate. The mixture was heated and was kept at atmospheric boiling conditions under reflux for 26 hours ($T_{boil}$~110° C.), under continuous stirring. A clear solution was obtained. At regular intervals, a sample was taken from the liquid and analyzed by $^1$H-NMR for meso-tartaric acid, DL-tartaric acid, and acetate content (a distinction between the D and L-enantiomer cannot be made by NMR).

The $^1$H-NMR analysis showed that meso-tartaric acid is converted to DL-tartaric acid until a level of about 40 wt % meso-tartaric acid (based on the total amount of tartaric acids) is obtained (see Table 8). After approximately 22 hours of boiling an equilibrium is reached. However, the amount of byproduct acetate increased with time to about 1 wt %.

After approximately 6 hours of boiling, a small amount of solids appeared. 1H-NMR and IR analysis showed this solid to be primarily sodium oxalate, a tartaric acid degradation product.

TABLE 8

Relative conversion in time according to Example F(ii).

| boiling time (hr) | Meso (wt % of total TA) | DL (wt % of total TA) |
|---|---|---|
| 0.0 | 77 | 23 |
| 3.0 | 70 | 30 |
| 4.1 | 52 | 48 |
| 5.1 | 43 | 57 |
| 6.1 | 42 | 58 |
| 7.1 | 42 | 58 |
| 22.0 | 40 | 60 |
| 26.0 | 40 | 60 |

For further illustration, the progress of both experiments is shown in FIG. 1. The results of Example F(i) are indicated with solid lines (with - ◊ - representing the amount of mesotartaric acid, and -■- representing the combined amounts of D- and L-tartaric acid). The results of Example F(ii) are indicated with dashed lines (with - - ◊ - - representing the amount of meso-tartaric acid, and - -■ - - representing the combined amounts of D- and L-tartaric acid).

It was found that an equilibrium was reached after about 6 hours with about 40 wt % of meso-tartaric acid and 60 wt % of D- and L-tartaric acid.

Comparative Example G

Effect of Lower Sodium Tartrate Content

Example G(i)

L-Tartaric Acid as Starting Material

In an experiment similar to Example F(i), 1,616 g of NaOH solution (containing 50 wt % NaOH and 50 wt % water) were mixed with 2,964.5 g water and 759.5 g L-tartaric acid. Upon mixing, the acid was neutralized, leading to a mixture containing 18.4 wt % disodium L-tartrate, 7.5 wt % NaOH, and 74.1 wt % water. The mixture was heated and was kept at atmospheric boiling conditions under reflux for 46 hours ($T_{boil}$~110° C.), under continuous stirring. A clear solution was obtained. At regular intervals, a sample was taken from the liquid and analyzed by $^1$H-NMR for meso-tartaric acid, DL-tartaric acid, and acetate content (a distinction between D and L-enantiomer cannot be made by NMR). The $^1$H-NMR analysis showed that L-tartaric acid is converted to meso-tartaric acid until a level of about 35 wt % meso (based on the total amount of tartaric acid) is obtained (see Table 9). After approximately 25 hours of boiling, no increase in conversion towards meso-tartaric acid is observed anymore. The amount of byproduct acetate increased with time to about 0.2 wt %.

TABLE 9

Relative conversion in time according to Example G(i).

| boiling time (hr) | Meso (wt % of total TA) | DL (wt % of total TA) |
|---|---|---|
| 0.0 | 0 | 100 |
| 1.1 | 6 | 94 |
| 3.1 | 13 | 86 |
| 5.1 | 19 | 81 |
| 6.8 | 23 | 77 |
| 21.5 | 33 | 67 |
| 25.5 | 33 | 67 |
| 30.8 | 33 | 67 |
| 45.9 | 35 | 65 |

Example G(ii)

A Mixture of Mesotartrate and DL-Tartarate as Starting Material

Prepared were 6.30 kg of a mixture containing 18.6 wt % disodium tartrate, (of which 78% was mesotartrate and 22% DL-tartrate), 7.6 wt % NaOH, and 73.7 wt % water. For practical reasons, this mixture was prepared from NaOH solution (50% NaOH in 50% water), water, and a reaction mixture prepared according to the procedure in Example 4a. The starting mixture is similar in all respects to the starting mixture of Example G(i) except for the meso/DL isomer ratio in the tartaric acid. The mixture was heated and was kept at atmospheric boiling conditions under reflux for 53 hours ($T_{boil}$~110° C.), under continuous stirring. A clear solution was obtained. At regular intervals, a sample was taken from the liquid and analyzed by $^1$H-NMR for meso-tartaric acid, DL-tartaric acid, and acetate content (a distinction between the D and L-enantiomer cannot be made by NMR).

The $^1$H-NMR analysis showed that meso-tartaric acid is converted to DL-tartaric acid until a level of about 34 wt % meso-tartaric acid (based on the total amount of tartaric acid) is obtained (see Table 10). After approximately 31 hours, an equilibrium is reached. However, the amount of byproduct acetate increased with time to about 0.4 wt % after 46 hrs.

TABLE 10

Relative conversion in time according to Example G(ii).

| boiling time (hr) | Meso (wt % of total TA) | DL (wt % of total TA) |
|---|---|---|
| 0.0 | 78 | 22 |
| 1.5 | 73 | 27 |
| 3.0 | 70 | 30 |
| 4.5 | 65 | 35 |
| 6.8 | 60 | 40 |
| 22.6 | 38 | 62 |
| 26.3 | 36 | 64 |
| 28.3 | 35 | 65 |
| 31.6 | 34 | 66 |
| 46.7 | 32 | 68 |
| 52.5 | 34 | 66 |

For further illustration, the experiments from Examples G(i) and G(ii) are shown in FIG. 2. The results of Example G(i) are indicated with solid lines (with - ◊ -representing the amount of meso-tartaric acid, and -■- representing the combined amounts of D- and L-tartaric acid). The results of Example G(ii) are indicated with dashed lines (with - - ◊ - - representing the amount of meso-tartaric acid, and - -■ - - representing the combined amounts of D- and L-tartaric acid).

At this lower NaOH content, the equilibrium is located at about 34 wt % meso-tartaric acid and 66 wt % DL-tartaric acid (of the total amount of tartaric acid); the formation of the byproduct acetate is considerably lower than in Example F. The reaction is slower.

The invention claimed is:

1. A process for the preparation of a sodium chloride composition comprising an iron complex of tartaric acid wherein between 55 and 90% by weight of the tartaric acid is meso-tartaric acid, the process comprising the steps of spraying an aqueous treatment solution comprising an iron complex of tartaric acid, with between 55 and 90% by weight of said tartaric acid being meso-tartaric acid, and having a pH of between 3 and 5 onto the sodium chloride composition; wherein the aqueous treatment solution comprising the iron complex of tartaric acid, with between 55 and 90% by weight of said tartaric acid being meso-tartaric acid, is obtained by a process comprising:
   (i) preparing an aqueous mixture comprising between 35 and 65% by weight of a di-alkali metal salt of L-tartaric acid, a di-alkali metal salt of D-tartaric acid, or a mixture of di-alkali metal salts of L-tartaric acid, D-tartaric acid, and optionally meso-tartaric acid, and between 2 and 15% by weight of an alkali metal or alkaline metal hydroxide,
   (ii) stirring and heating the aqueous mixture for between 3 and 200 hours to a temperature of between 100° C. and its boiling point until between 55 and 90% by weight of tartaric acid has been converted to meso-tartaric acid,
   (iii) cooling and optionally adding water,
   (iv) optionally adjusting the pH to a pH of between 5 and 9,
   (v) stirring and admixing the obtained mixture with an iron(II) salt, an iron(III) salt or a mixture thereof,
   (vi) and if the pH is outside the range of between 3 and 5, adjusting the pH of the mixture from step (v) to a pH of between 3 and 5.

2. The process for the preparation of the sodium chloride composition according to claim 1, wherein the pH is adjusted by addition of an acid selected from the group consisting of HCl, formic acid, oxalic acid, sulphuric acid, and any combination thereof.

3. The process for the preparation of the sodium chloride composition according to claim 1, wherein the alkali metal in the tartaric acid salt comprises sodium and wherein the alkali metal hydroxide comprises sodium hydroxide.

4. The process for the preparation of the sodium chloride composition according to claim 1, wherein the iron(III) source is $FeCl_3$ or $FeCl(SO_4)$.

5. The process for the preparation of the sodium chloride composition according to claim 1, wherein the aqueous treatment solution comprises between 0.5 and 25% by weight of tartaric acid, with between 55 and 90% by weight thereof being meso-tartaric acid.

6. The process for the preparation of the sodium chloride composition according to claim 1, wherein the molar ratio between iron and tartaric acid is between 0.1 and 2, the molar ratio being a ratio of the molar amount of iron divided by the total molar amount of tartaric acid.

7. The process for the preparation of the sodium chloride composition according to claim 2, wherein the aqueous solution is sprayed onto the sodium chloride composition in such an amount as to obtain a concentration of between 1 and 200 ppm of iron in said non-caking sodium chloride composition.

8. The process for the preparation of the sodium chloride composition according claim 1, wherein the aqueous treatment solution has a pH of between 4 and 4.5 onto the sodium chloride composition.

* * * * *